Oct. 20, 1936.                     J. C. COX                      2,058,063
                              BRAKING APPARATUS
                           Filed Nov. 18, 1932              3 Sheets—Sheet 1
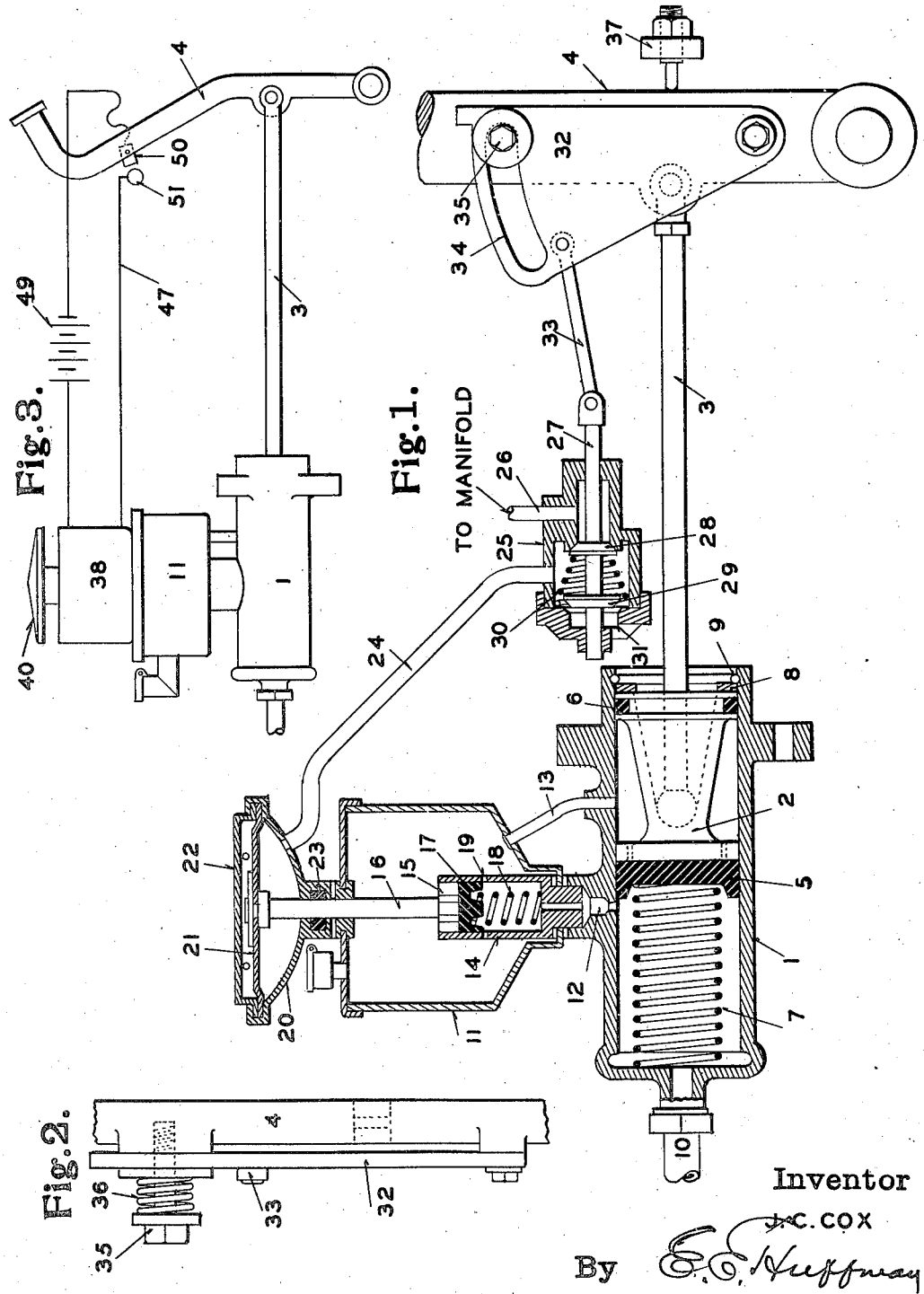
Inventor
J. C. COX
By E. E. Huffman
Att'y.

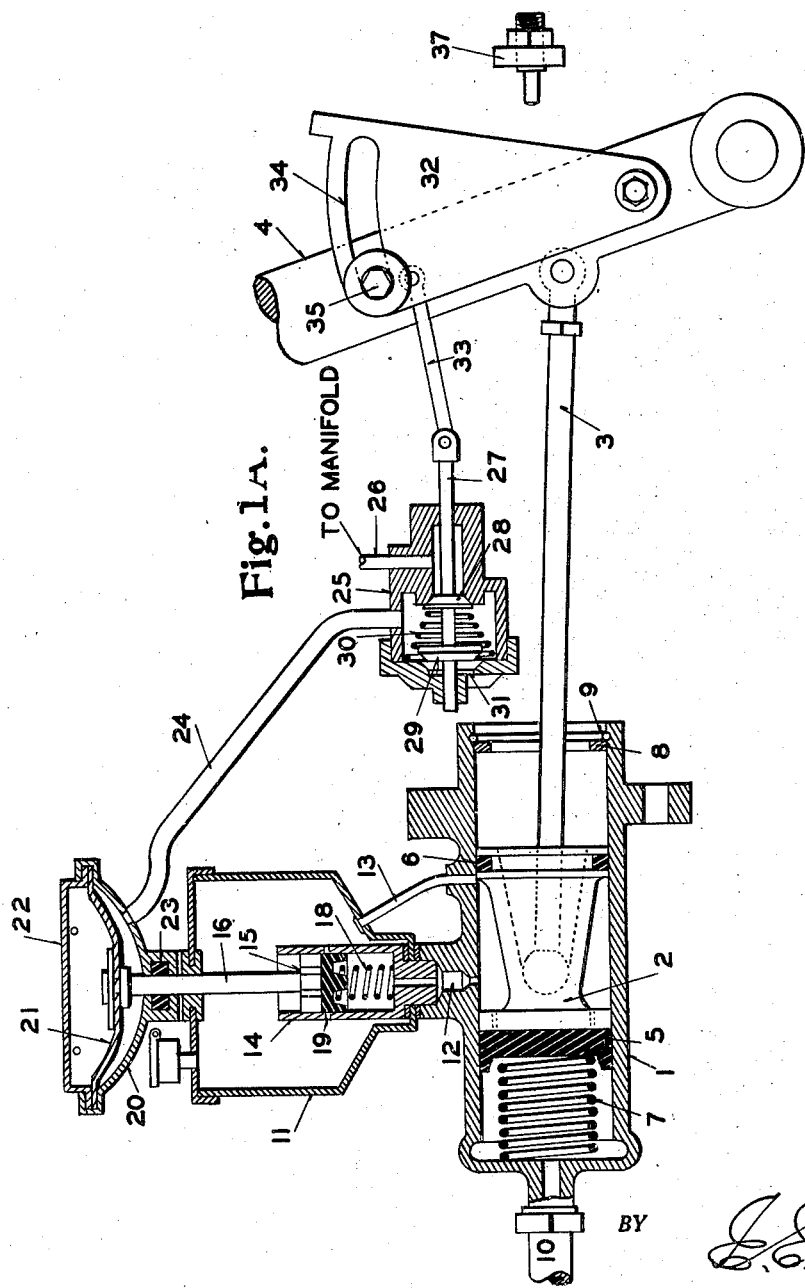

Oct. 20, 1936.  J. C. COX  2,058,063
BRAKING APPARATUS
Filed Nov. 18, 1932  3 Sheets-Sheet 3

Inventor
J.C.COX
By E.E.Huffman
Att'y.

Patented Oct. 20, 1936

2,058,063

UNITED STATES PATENT OFFICE 2,058,063

BRAKING APPARATUS

John C. Cox, St. Louis, Mo., assignor to Wagner Electric Corporation, St. Louis, Mo., a corporation of Delaware Application November 18, 1932, Serial No. 643,135

14 Claims. (Cl. 60—54.6)

My invention relates to fluid braking apparatus and more particularly to improvements in compensating master cylinders for placing fluid in the system under pressure to operate the brakes.

Master cylinders of the compensating type are provided with a port in the cylinder communicating with the fluid reservoir, this port being just forward of the piston when the piston is in its retracted position, whereby fluid may flow into or out of the cylinder to compensate for any volumetric deficiencies or excesses of fluid in the system caused by changes in temperature, leakage, or flow of fluid past the piston on its return stroke. When the piston of the master cylinder is moved by the brake pedal to apply pressure to the system, fluid escapes through the compensating port until the piston has completely closed it, thus resulting in loss of effective brake pedal movement. A further loss of effective brake pedal movement results from the necessity of placing the piston stop in such a position as to insure that the port will be uncovered in the retracted position of the piston regardless of variances in the machining of parts of the master cylinder.

One of the objects of my invention is to provide the compensating master cylinder of a fluid brake system with means for decreasing the piston movement (and, therefore, the pedal travel) necessary to apply the brakes.

Another object of my invention is to provide a compensating master cylinder apparatus with means whereby the compensating passage will be closed prior to the movement of the cylinder piston past the compensating port.

A further object is to provide a compensating master cylinder apparatus with means for placing the fluid in the cylinder under pressure prior to the movement of the master cylinder piston past the compensating port, said means being controlled by the mechanism for operating the master cylinder piston.

Other objects of my invention will become apparent from the following description taken in connection with the accompanying drawings disclosing three embodiments thereof.

Figure 5:
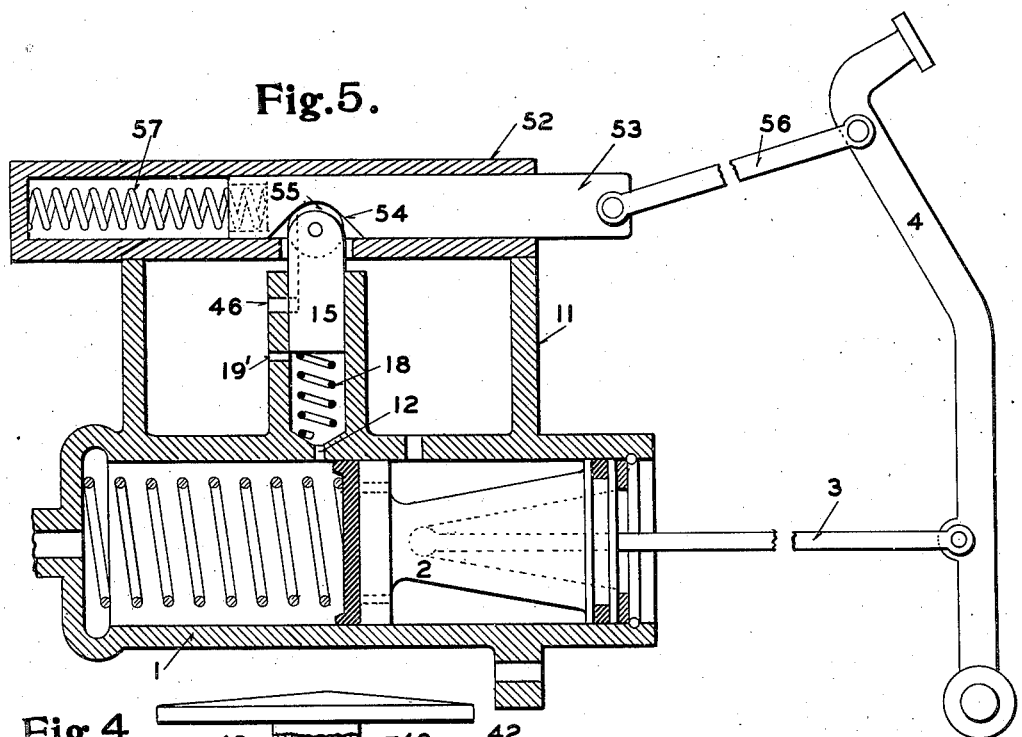
Figure 4:
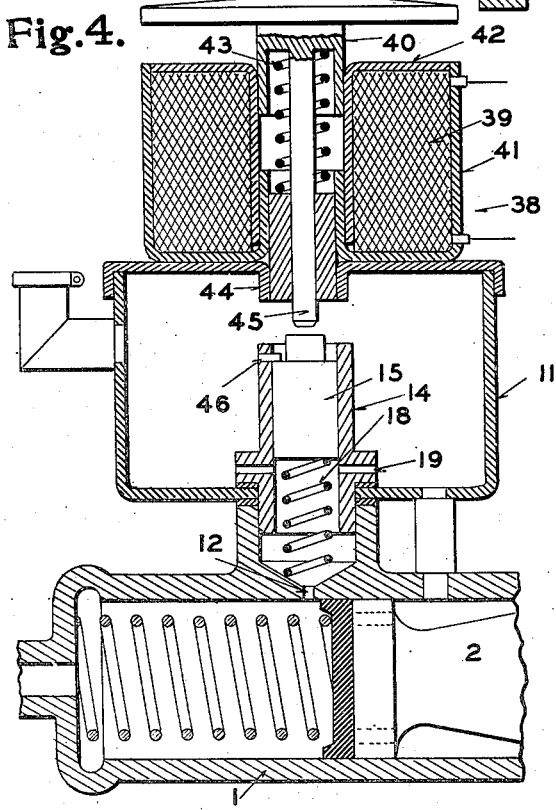

In the drawings Figure 1 is a view, partly in section, showing my invention applied to a compensating master cylinder apparatus, the piston for placing the fluid in the master cylinder under pressure prior to the closing of the compensating port by the master cylinder piston being operated by a suction motor; Figure 1A is a view similar to that of Figure 1 but showing the position of the parts just after release of the pedal; Figure 2 is a rear view of the brake pedal shown in Figure 1; Figures 3 and 4 are views showing means for electrically operating the piston for applying pressure to the master cylinder prior to the closing of the compensating port by the master piston; and Figure 5 is a view showing mechanical means for operating the piston.

Referring to Figures 1 and 2, the numeral 1 indicates a master cylinder within which is the master piston 2 actuated by the piston rod 3 and the pedal 4. The head of the piston is provided with a packing cup 5 and the rear portion with a secondary packing 6. A coiled spring 7 biases the piston to a retracted position against the stop 8 held in position by the lock spring 9. The outlet conduit 10 leads to the wheel cylinder (not shown) for actuating the brake shoes. A fluid reservoir 11 is secured to the top of the cylinder 1 and is in communication therewith, by means of a passage and compensating port 12, the port entering the cylinder at a point just ahead of the cup 5 when the piston 2 is in its retracted position. The reservoir is also in communication with the cylinder at a point between the head and rear of the piston by means of a conduit 13.

In accordance with my invention I provide the reservoir with a cylinder 14, the lower end of which communicates with the compensating port 12 and the upper end opens into the reservoir. A piston 15, mounted on a rod 16 and provided with a packing cup 17, is adapted to reciprocate in the cylinder, the piston being grooved, as shown. A spring 18 biases the piston to a position whereby the passages 19 are uncovered to place the reservoir in communication with the compensating port.

The rod 16 extends into the chamber 20 of a suction motor and is secured to the flexible diaphragm 21 which is held in place by a perforated cover 22. The chamber 20 is sealed by the piston packing 23. A conduit 24 connects the chamber with a valve casing 25 which, in turn, is in communication, by means of conduit 26, with the manifold of the vehicle engine (not shown). The valve stem 27 has secured thereto a pair of valve elements 28 and 29, each adapted to cooperate with valve seats in the casing. A spring 30 normally biases the valve element 28 against its seat and the valve element 29 away from its seat. An opening 31 in the valve casing permits communication with the atmosphere when the valve element 29 is unseated.

A plate 32 is pivoted to the brake pedal 4 and is connected to the valve stem 27 by means of a rod 33. The plate 32 is provided with an arcuate slot 34 through which extends a bolt 35 carrying a coiled spring 36 for biasing the plate against the brake pedal, thus forming a friction connection. An adjustable stop 37 limits the rearward movement of the brake pedal.

In operation, when it is desired to apply the brakes, the brake pedal is moved forward to actuate the master cylinder piston 2. A certain amount of pedal movement is permitted before the piston is moved sufficiently to cause the cup 5 to cover the compensating port, due to the positioning of the piston stop 8 to insure that the compensating port is open when the piston is in its retracted position under adverse machining of the parts. During the movement of the pedal prior to the closing of the compensating port, the plate 32 will be carried forward by the pedal and rod 33 will be moved through a sufficient greater distance than rod 3, due to its being connected at a greater distance from the pedal pivot to unseat the valve element 28 and seat the valve element 29. The chamber 20 of the suction motor will, therefore, be placed in communication with the engine manifold, thus creating a vacuum in the chamber whereby atmospheric pressure will force piston 15 downwardly, cutting off the passages 19 and forcing fluid into the master cylinder through the compensating port. The operation of the vacuum motor will be substantially simultaneous with the closing of valve 29 and the opening of valve 28 since the volume of air to be withdrawn from the chamber of the motor and the conduit 24 is small. The charge of fluid into the cylinder is such as to place the fluid therein under pressure and to cause the brake shoes (not shown) to begin to move toward the brake drum. Further movement of the brake pedal causes the piston 2 to move sufficiently to cover the compensating port and to apply additional pressure to the fluid in the master cylinder in a well known manner. During this movement of the brake pedal, plate 32 is permitted, by the friction device, to move relatively to the pedal.

From the foregoing it is seen that I have provided means whereby, when the master cylinder piston has been moved sufficiently to close the compensating port and apply pressure to the fluid in the cylinder, the fluid has already been placed under a sufficient pressure to begin to actuate the brakes. This results in a material saving of pedal movement to apply the brakes for without my invention the brakes would not begin to be applied until the compensating port is closed by movement of the piston. Also, by using a shorter pedal movement to apply the brakes, a higher pedal leverage may be used. It is also to be noted that by providing for pressure on each side of the lip of the cup as it passes the compensating port, there is less danger of damage thereto.

When the brake pedal is released, the plate 32 is carried with it until the valve element 28 is seated and the valve element 29 is unseated, thereby admitting air under atmospheric pressure to the chamber of the suction motor. Figure 1A shows the position of the parts just after the pedal has been released with the valve 29 open and the piston 17 in the middle of its return stroke. The spring 18 will then return the piston 15 to its normal position. During the return movement of piston 15, fluid is permitted to flow past the piston by means of its grooves, thus preventing the "sucking" of air into the system as the master cylinder piston is moving to its retracted position. After the valve element 28 has been seated, the friction device permits the brake pedal to move relatively to the plate 32 whereby the spring 7 will return the piston 2 to retracted position. It is thus seen that initial release of the pedal permits piston 15 to return to retracted position, and further release of the pedal permits piston 5 to return to retracted position.

In Figures 3 and 4, I have disclosed electrical means controlled by the brake pedal for operating the piston for placing the fluid in the master cylinder under pressure prior to the closing of the compensating port by the master cylinder piston. The top of the reservoir 11 carries a solenoid 38 comprising an electrical winding 39 and an armature 40. The winding 39 is enclosed in annular frame members 41 and 42 composed of a suitable material. The member 42 forms a guide for the armature which is biased to an inoperative position by the coiled spring 43 interposed between a shoulder on the armature and a fixed bearing 44 for the striker rod 45 of the armature. This rod extends into the reservoir to a point spaced from the top of the piston 15. The piston 15 is adapted to reciprocate in its cylinder 14 and is biased against the stop 46 by the spring 18, permitting the passages 19 to be normally open. The electrical circuit 47 of the solenoid comprises a suitable source of current 48 and a switch embodying a movable contact 50 and a stationary contact 51, the movable contact being carried by the brake pedal 4 and in the released position of the pedal is out of contact with the stationary contact.

In the operation of this embodiment of my invention, when the brake pedal 4 is actuated to apply the brakes, the contacts 50 and 51 are closed prior to sufficient movement of the master cylinder piston 2 and its cup to close the compensating port 12. Upon closing of the contacts, the solenoid is energized, causing the armature to move downwardly and operate the piston 15 to force a change of fluid into the master cylinder 1 and the brake lines, thus securing the same result as described with respect to the apparatus of Figure 1. The contacts 50 and 51 are opened to deenergize the solenoid and permit return of the piston 15 after the master cylinder piston 2 and its cup have moved sufficiently to close the compensating port. On the return movement of the brake pedal the contacts 50 and 51 will be closed and reopened, but since the return movement is generally more rapid than forward movement and, therefore, contacts 50 and 51 will not be in contact long enough to cause the solenoid to function sufficiently to operate the piston 15. Even if piston 15 should be operated during the return of the pedal, no harm will be done. The gap between the striker rod 45 and the piston 15 in their normal positions, permits the armature to accelerate before engaging the piston when the solenoid is energized.

In Figure 5 I have provided a mechanical connection between the piston 15 and the brake pedal for operating the piston. The top of the reservoir 11 carries a guide 52 in which a plunger 53 is adapted to reciprocate. The rod is provided with a recess 54 into which fits a roller 55 carried on the end of the piston 15, said roller being biased in said groove by the piston return spring 18. The plunger is connected to the brake pedal 4 by a rod 56 and is biased by the spring 57 to the position shown.

In operation, when the brake pedal 4 is moved, the plunger 53, by means of its recess 54, forces the piston 15 downwardly and injects fluid into the master cylinder in the same manner as previously described.

Having fully described my invention, what I claim as new and desire to secure by Letters Patent of the United States is:

1. In fluid braking apparatus, a compensating compressor comprising a cylinder, a piston, and a reservoir in communication with the cylinder when the piston is in the retracted position, means for actuating the piston, means comprising a second cylinder and piston for cutting off communication between the reservoir and the cylinder and for applying pressure to the fluid in the cylinder when the compressor piston is in non-pressure applying position, means for controlling said second piston by the compressor piston actuating means, and means for returning said second piston to inoperative position when said actuating means is initially released prior to the movement of the compressor piston to released position.

2. In fluid braking apparatus, a compensating compressor comprising a cylinder, a piston, and a reservoir communicating with the cylinder in the retracted position of the piston, actuating means for the piston, a second cylinder and piston for applying pressure to the fluid in the compressor cylinder when the piston thereof is in non-pressure applying position, a plunger provided with a cam surface for operating said second piston, and a rod connected to the actuating means for operating the plunger.

3. In fluid braking apparatus, the combination of a pressure cylinder, a piston therein, a reservoir, means forming a passage between the reservoir and the cylinder and uncovered by the piston when the piston is in retracted position, a pivoted lever connected to the piston for actuating the piston in pressure applying direction, all movement of the lever in said direction being effective to move the piston, and means for closing the connection of said passage to the reservoir and for forcing fluid into the cylinder through the passage prior to sufficient movement of the piston to close the passage, said means being controlled by means actuated by the movement of a portion of the lever which is farther removed from the lever pivot than the portion of said lever whose movement corresponds to the movement of the piston.

4. In fluid braking apparatus, the combination of a pressure cylinder, a piston therein, a reservoir, means forming a passage between the reservoir and the cylinder and uncovered by the piston when the piston is in retracted position, a lever for actuating the piston in pressure applying direction, all movement of the lever in said direction being effective to move the piston, means comprising a second cylinder and piston for closing the connection of said passage to the reservoir and for forcing fluid through said passage into the first named cylinder, the axis of said second cylinder being out of alignment with the axis of said first named cylinder, and means controlled by the lever during its initial movement for actuating the second piston prior to sufficient movement of the first named piston to close the passage.

5. In fluid braking apparatus, the combination of a cylinder, a piston therein, a reservoir, a second cylinder in the reservoir communicating with the first named cylinder when the piston thereof is in retracted position, the axes of said cylinders being out of alignment, a piston in said second cylinder, means forming a passage between the reservoir and said second cylinder which is uncovered by the piston therein when the piston is in retracted position, means for actuating said first named piston in pressure applying direction, all movement of the actuating means in said direction being effective to move the piston, and means controlled by the actuating means to operate said second cylinder piston to apply pressure to the fluid in the first named cylinder prior to the movement of the first named piston cutting off communication between the cylinders.

6. In fluid braking apparatus, the combination of a cylinder, a piston therein, a reservoir, a second cylinder in the reservoir communicating with the first named cylinder when the piston thereof is in retracted position, a piston in said second cylinder, means forming a passage between the reservoir and said second cylinder which is uncovered by the piston therein when the piston is in retracted position, a lever having a fixed pivot and connected to actuate the first named piston, and means for operating said second piston to force fluid under pressure through the passage from the reservoir into the first named cylinder prior to sufficient movement of the piston to close said passage, said means being governed by means actuated by a portion of the lever which is farther removed from the lever pivot than the portion of said lever whose movement corresponds to the movement of the piston.

7. In fluid braking apparatus, the combination of a pressure cylinder, a piston therein, a reservoir, means forming a passage between the reservoir and the cylinder and uncovered by the piston when the piston is in retracted position, control means for actuating the piston in pressure applying direction, all movement of the control means in said direction being effective to move the piston, means comprising a second cylinder and piston for closing the connection of said passage to the reservoir and for applying pressure to the fluid in the compressor cylinder prior to sufficient movement of the compressor cylinder piston to close the passage, a suction motor for operating said second piston, and valve means operable by the initial movement of the control means for controlling the suction motor.

8. In fluid braking apparatus, the combination of a pressure cylinder, a piston therein, a reservoir, means forming a passage between the reservoir and the cylinder and uncovered by the piston when the piston is in retracted position, control means for actuating the piston in pressure applying direction, all movement of the control means in said direction being effective to move the piston, means for closing the connection of said passage to the reservoir and for applying pressure to the fluid in the cylinder prior to sufficient movement of the piston to close the passage, a suction motor for operating said pressure applying means, and means for controlling the suction motor by the control means.

9. In fluid braking apparatus, the combination of a pressure cylinder, a piston therein, a reservoir, means forming a passage between the reservoir and the cylinder and uncovered by the piston when the piston is in retracted position, means for actuating the piston in pressure applying direction, means for closing the connection of said passage to the reservoir and for applying pressure to the fluid in the cylinder prior to sufficient movement of the piston to close the passage, a suction motor for operating said pressure applying means, a valve for controlling the suction motor, and means for opening said valve when said actuating means is initially operated and for closing said valve when said actuating means is initially released.

10. In fluid braking apparatus, the combination of a pressure cylinder, a piston therein, a reservoir, means forming a passage between the reservoir and the cylinder and uncovered by the piston when the piston is in retracted position, control means for actuating the piston in pressure applying direction, all movement of the control means in said direction being effective to move the piston, means for closing the connection of said passage to the reservoir and for applying pressure to the fluid in the pressure cylinder prior to sufficient movement of the piston to close the passage, electrical means for operating said last named means, and means for controlling said electrical means by the control means.

11. In fluid braking apparatus, the combination of a pressure cylinder, a piston therein, a reservoir, means forming a passage between the reservoir and the cylinder and uncovered by the piston when the piston is in retracted position, control means for actuating the piston in pressure applying direction, all movement of the control means in said direction being effective to move the piston, means for closing the connection of said passage to the reservoir and for applying pressure to the fluid in the compressor cylinder prior to sufficient movement of the piston to close the passage, said means comprising a second cylinder and piston, a solenoid for operating said second piston, and means controlled by said control means for energizing said solenoid.

12. In fluid braking apparatus, the combination of a pressure cylinder, a piston therein, a reservoir, means forming a passage between the reservoir and the cylinder and uncovered by the piston when the piston is in retracted position, control means for actuating the piston in pressure applying direction, all movement of the control means in said direction being effective to move the piston, means for closing the connection of said passage to the reservoir and for applying pressure to the fluid in the pressure cylinder prior to sufficient movement of the piston to close the passage, power means for operating said last named means, and means for controlling said power means by the piston control means.

13. In fluid braking apparatus, the combination of a pressure cylinder, a piston therein, a reservoir, means forming a passage between the reservoir and the cylinder and uncovered by the piston when the piston is in retracted position, a pivoted lever connected to actuate the piston in pressure applying direction, all movement of the lever in said direction being effective to move the piston, means for closing the connection of said passage to the reservoir and for forcing fluid into the pressure cylinder through the passage prior to sufficient movement of the piston to close the passage, and means for controlling said last named means by a portion of the lever which has a greater arc of travel than that portion of the lever which actuates the piston.

14. In fluid braking apparatus, the combination of a pressure cylinder, a piston thereon, a reservoir, means forming a passage between the reservoir and the cylinder and uncovered by the piston when the piston is in retracted position, a pivoted lever and connecting means between the piston and the lever for actuating the piston in pressure applying direction, all movement of the lever in said direction being effective to move the piston, and means independent of the connecting means for closing the connection of said passage to the reservoir and for forcing fluid into the pressure cylinder through the passage prior to sufficient movement of the piston to close the passage, said means being controlled by means actuated by a portion of the lever which has a greater arc of travel than that portion of the lever which actuates the connecting means.

JOHN C. COX.